United States Patent
Dixon

(10) Patent No.: US 6,415,475 B1
(45) Date of Patent: Jul. 9, 2002

(54) HANDLE FOR ADJUSTABLE HITCH HEAD ASSEMBLY

(76) Inventor: Richard W. Dixon, 24 Cooley La., Hewett, NJ (US) 07421

( * ) Notice: Subject to any disclaimer, the term of this patent is extended or adjusted under 35 U.S.C. 154(b) by 0 days.

(21) Appl. No.: 09/794,552

(22) Filed: Feb. 27, 2001

(51) Int. Cl.[7] ............................. A45C 13/22; B62B 7/00
(52) U.S. Cl. ........................ 16/110.1; 16/422; 16/425; 16/436; 16/443; 280/490.1; 280/504; 280/514; 280/515
(58) Field of Search ................................ 16/110.1, 422, 16/424, 425, 436, 443; 81/177.1, 177.2, 487; D12/162, 178; 294/15, 16, 26, 90, 145; 254/113–115, 120–123; 172/677, 678; 280/490.1, 491.5, 416.2, 416.3, 479.2, 504, 514, 515

(56) References Cited

U.S. PATENT DOCUMENTS

| | | | |
|---|---|---|---|
| 3,679,233 A | * 7/1972 | Baker et al. | .............. 280/476.1 |
| 4,555,125 A | * 11/1985 | Goodlove | .................... 280/515 |
| 4,645,224 A | * 2/1987 | Poganski | .................... 280/400 |
| 4,784,369 A | * 11/1988 | Bock | ............................. 254/45 |
| 4,979,238 A | * 12/1990 | Clark | ............................. 16/422 |
| 5,354,087 A | * 10/1994 | Head | ....................... 280/490.1 |
| 5,415,445 A | * 5/1995 | Van Mullen et al. | ....... 294/145 |
| 5,489,110 A | 2/1996 | Van Dusen | |
| 5,615,904 A | 4/1997 | Van Dusen et al. | |
| 5,735,539 A | 4/1998 | Kravitz | |
| 5,882,027 A | 3/1999 | Tevis | |
| 6,062,583 A | 5/2000 | Lauricella, Jr. | |
| 6,126,188 A | 10/2000 | Volodarsky | |
| 6,135,482 A | * 10/2000 | Larkin | ...................... 280/416.1 |
| 6,158,760 A | 12/2000 | Kiss | |
| 6,193,260 B1 | * 2/2001 | Homan et al. | .............. 280/504 |

* cited by examiner

Primary Examiner—Chuck Y. Mah
(74) Attorney, Agent, or Firm—Klauber & Jackson

(57) ABSTRACT

A hitch handle for engaging and facilitating carrying of a hitch head assembly of the type which includes a substantially vertically extending adjustable hitch bar having one or more circular openings. The handle has an L-shaped portion, the elongated leg of which forms a hand grasp for the user and the shortened leg of which extends in a direction to in use bear against a part of the hitch bar. The front leg of the U member is secured to the elongated leg of the L-shaped portion, the U member being in a plane transverse to the plane of the L-shaped portion. The second leg of the U-shaped member is removably receivable in an opening in the substantially vertical hitch bar. Upon the second leg of the U being so received, an upward force supplied by the user at the hand grasp rotates the L around the axis defined by the second leg of the U to bring the shorter leg to bear against the hitch head assembly, thereby frictionally locking the handle against further rotation and enabling balanced lifting of the hitch head assembly by the user.

7 Claims, 6 Drawing Sheets

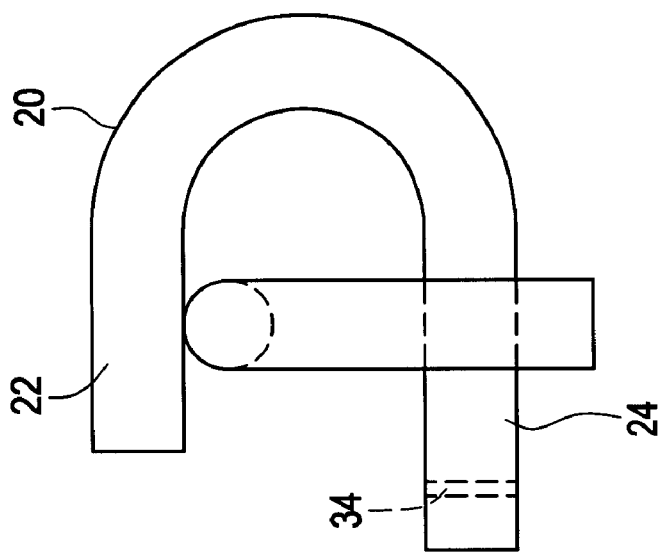
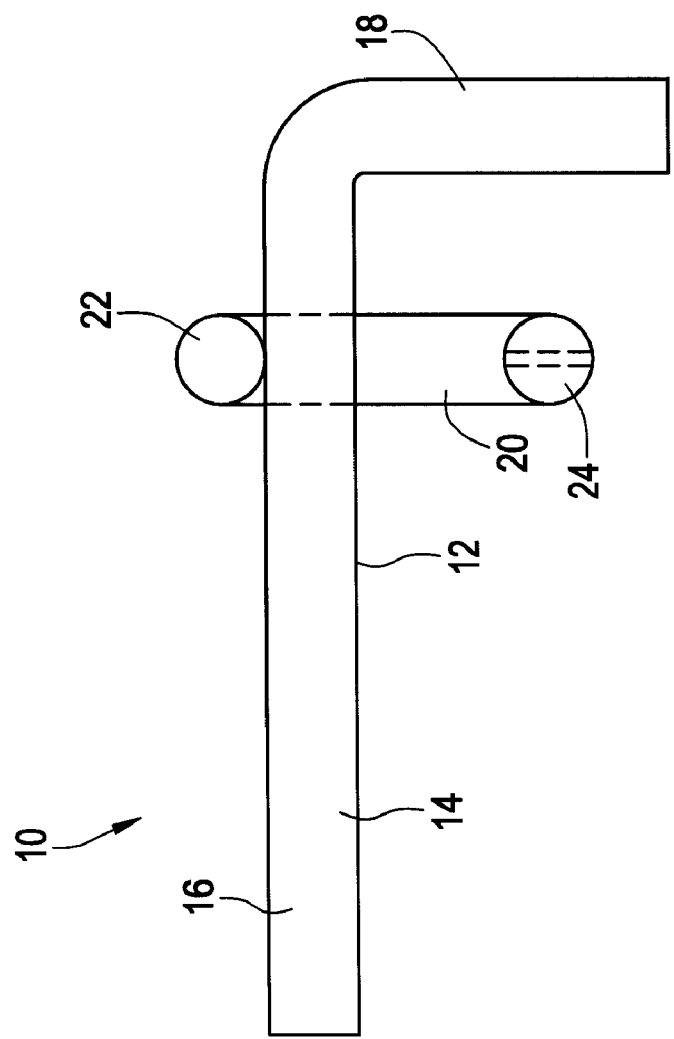

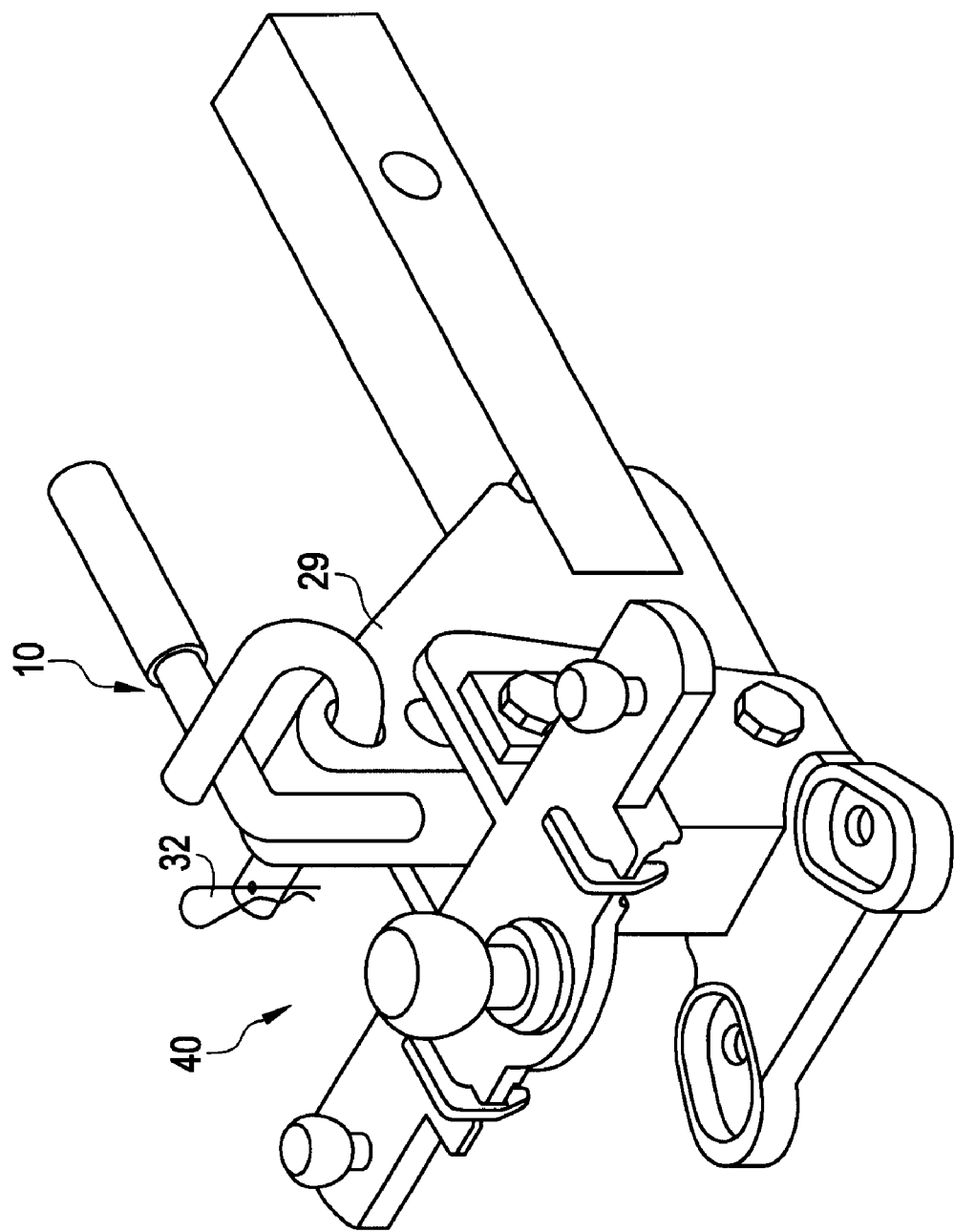

HANDLE FOR ADJUSTABLE HITCH HEAD ASSEMBLY

FIELD OF INVENTION

This invention relates to an apparatus which when attached to an adjustable hitch head assembly can be used to facilitate the installation, removal and transport of the hitch head assembly. The invention, referred to herein as a "hitch handle", is constructed of a material that can withstand the weight of the trailer hitch head assembly, which can be in excess of 50 pounds. Although the material of construction can be a polymeric composite material such as a glass filled nylon, the preferred material of construction is a strong durable metal such as iron, stainless steel, etc.

BACKGROUND OF INVENTION

Hitches are used to connect trailers such as mobile homes, travel trailers, horse trailers, motorcycle trailers and the like to a vehicle, which will then tow the connected ensemble to the desired location. Hitch head assemblies are cumbersome in design and construction, rendering them difficult to manually transport when they are not being used. Hitch head assemblies are heavy as they are constructed of metal and can weigh from 40–80 pounds. During the installation of the hitch head assembly at the vehicle and the removal of the assembly from the vehicle, they are usually manually handled. Due to the weight, the person carrying the hitch head assembly may suffer serious injury to the back in bending and lifting the hitch head assembly. Also, hitch head assemblies are usually well lubricated to cut down on friction. The person who elects to manually manipulate or carry the hitch head assembly usually smears the grease on his/her clothing, hands, etc. during the process.

BRIEF SUMMARY OF INVENTION

The present invention, referred to herein as a "hitch handle", attaches to the top or other hole in the adjustable hitch bar portion of the hitch head assembly in a fashion that renders the assembly easily lifted and balanced in one hand, which increases the mobility of the hitch head assembly. The hitch handle is thus designed so that the hitch head assembly is easily balanced for transportation. This feature enables the person attaching, transporting or detaching the assembly to be less encumbered during the process and produces less stress on the lower back.

The apparatus of the invention is unitary but may be assembled from two parts that are connected by a weld or other fabricated joint. The first part is U-shaped and in use is oriented toward a vertical plane. It is attached by a weld or fabrication joint to a second L-shaped part. The L-shaped part comprises a straight horizontal bar and a shorter leg bent in the downward direction. The joint is at the top of the U-shaped part, leaving the bottom leg of the U free. This free extension slips through at least one hole in the adjustable hitch bar and is secured with a locking device.

The second part to which the U-shaped part is attached forms the handle and the bent shorter leg at the forward end helps to stabilize the apparatus when in use. In the preferred design the angle of the bend at the forward extension of the handle is about 90 degrees.

The hitch handle thus "hooks" into the top hole of the adjustable hitch bar to form an extension that fits easily in the hand. This extended part may be covered with a soft frictional material to improve the gripping capability. Although the hitch head assembly may be carried with either end at the front of the person carrying the hitch head assembly, it is more comfortable to have the assembly at the side and the remainder of the assembly to the rear. The hitch handle thus balances the hitch head assembly to reduce the awkwardness of carrying the assembly.

BRIEF DESCRIPTION OF THE DRAWINGS

The invention is diagrammatically illustrated in the drawings attached hereto in which:

FIG. 1 is a plan view of the hitch handle of the present invention;

FIG. 2 is an end view of the hitch handle taken from the right side of FIG. 1;

FIG. 7 is a further perspective view similar to FIG. 6, except showing the handle fully engaged with the hitch head assembly, the view being from the opposite side of the hitch to which it is attached.

DESCRIPTION OF PREFERRED EMBODIMENT

Figure 3:
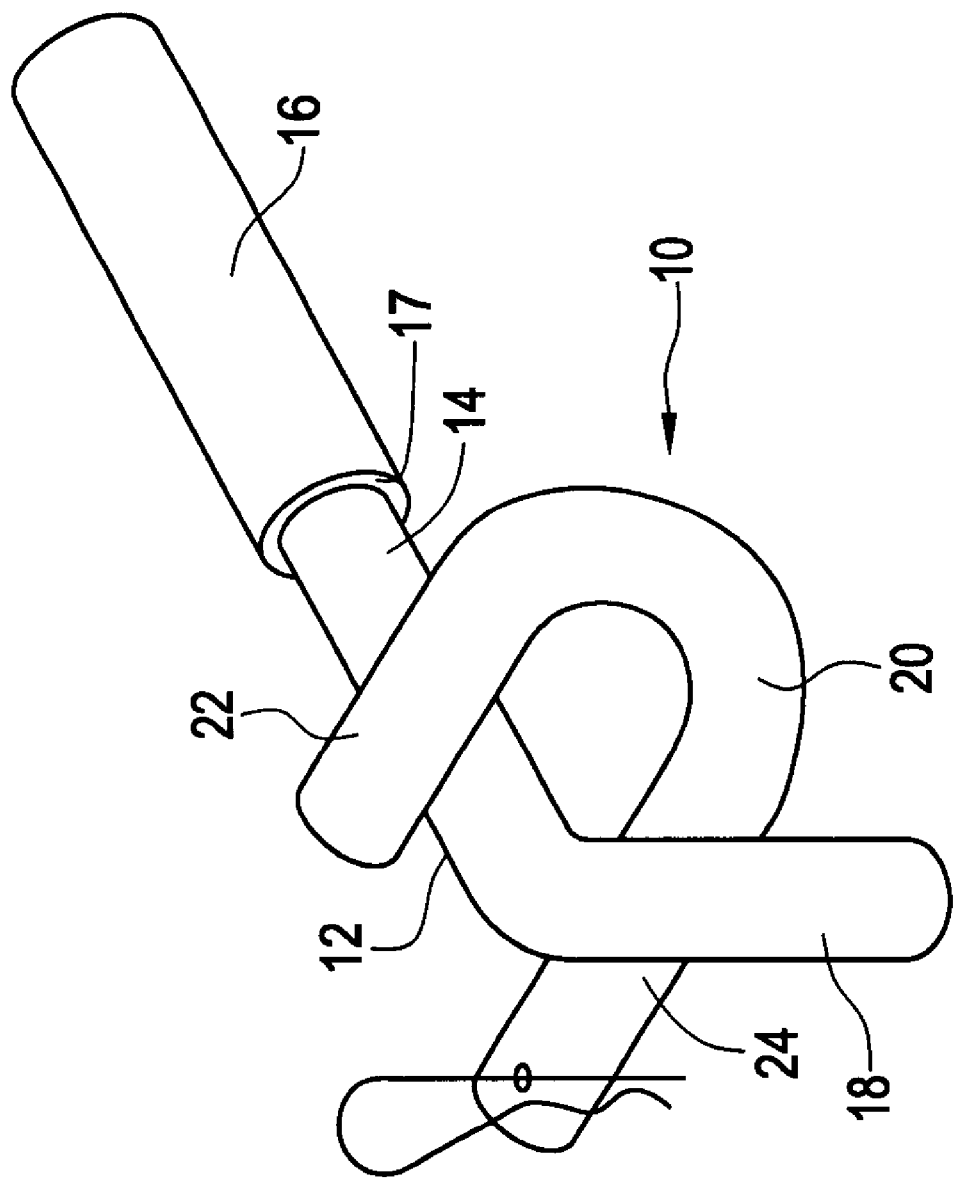
FIG. 3 is a perspective view of the hitch handle of FIGS. 1 and 2.

As best seen in FIGS. 1 and 2 the hitch handle 10 of the present invention includes an L-shaped portion 12, the elongated leg 14 of which extends in a direction so that in use it may form a hand grasp 16. As seen for example in FIG. 3, the hand grasp 16 can comprise a soft frictional material 17 such as rubber, plastic or the like. The shortened leg 18 of the L-shaped portion is designed to bear against a portion of the hitch head assembly.

Figure 4:
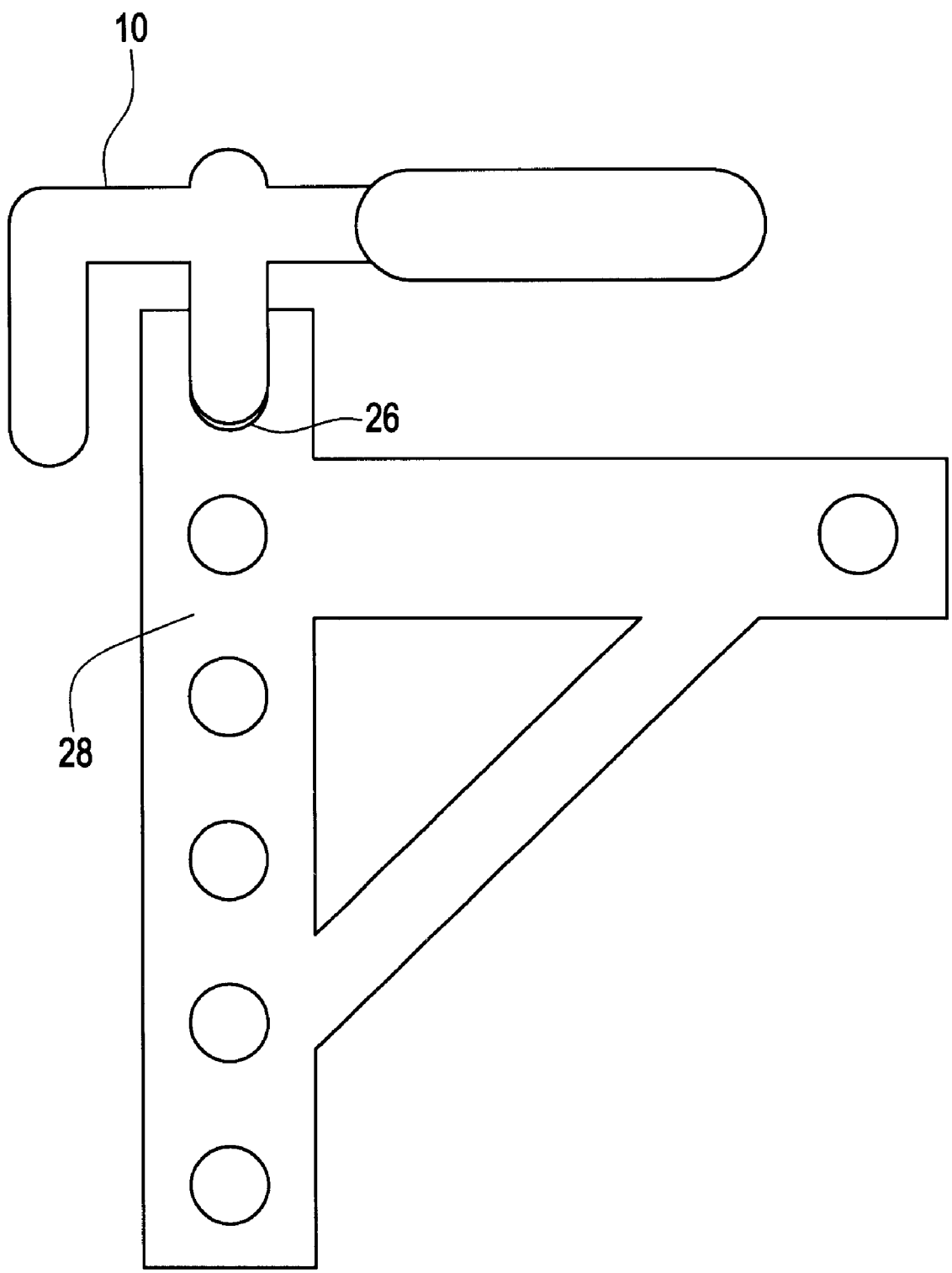
FIG. 4 is a schematic view showing the hitch handle of the invention assembled in combination with an adjustable hitch bar which forms part of a hitch head assembly which is to be carried by use of the invention.
Figure 5:
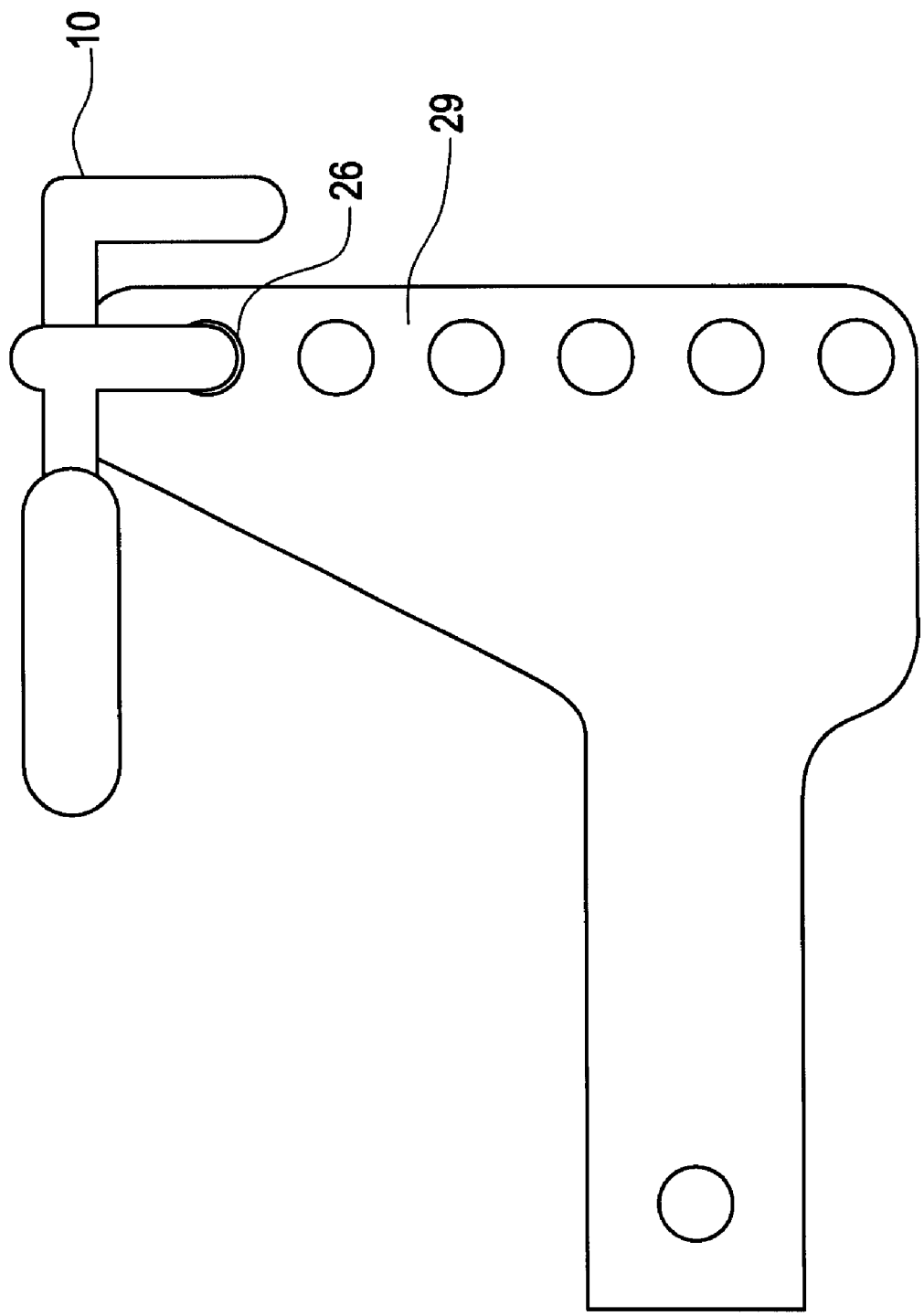
FIG. 5 is a schematic view similar to FIG. 4, but showing the invention in use with a second type of adjustable hitch bar.
Figure 6:
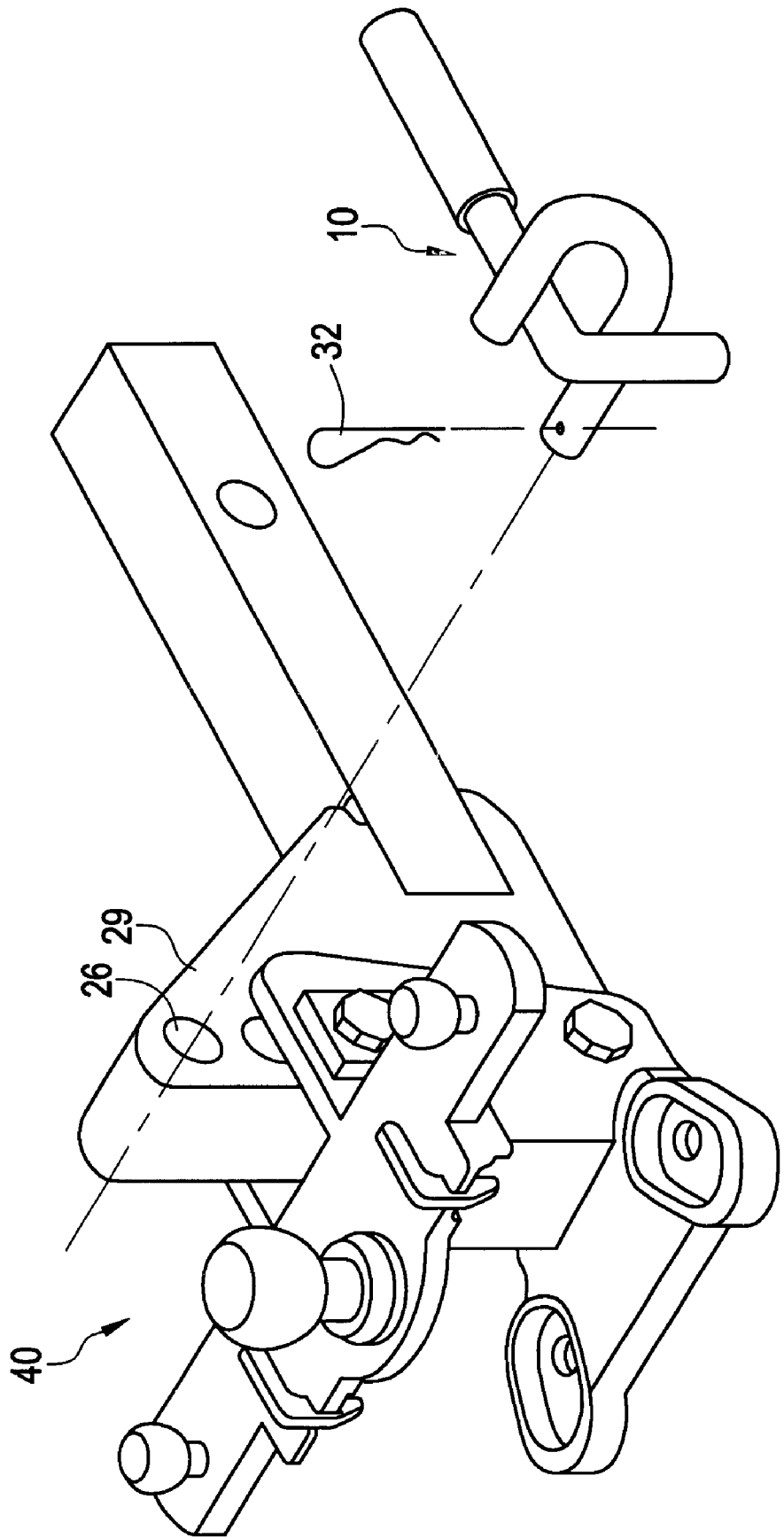
FIG. 6 is a perspective view showing the manner in which the handle is engaged with a hitch head assembly.

A U-shaped member 20 has a first leg 22 which is secured to the elongated leg 14 of the L-shaped portion 12. The securing can be effected by welding or by other connecting methods, either mechanical or otherwise. Or it is possible to form the entire handle 10 from a single piece, as for example by a molding or other procedure. The U-shaped member 20 is seen to be in a plane transverse to the plane of the L-shaped portion 12. The second leg 24 of U-shaped member 20 is removably receivable in one of the openings 26 (FIG. 3) in the adjustable hitch bar, two types of which are shown schematically at 28 and 29 in FIGS. 4 and 5 respectively. The adjustable hitch bar 29 is shown in use in FIGS. 6 and 7, where in combination with a ball mount it forms part of the hitch head assembly 40. It will be appreciated that the assembly 40, the adjustable hitch bars 28, 29, etc., are all conventional commercial products.

It will be evident from viewing of FIGS. 4 through 7, that upon the said leg 24 of the U-shaped member 20 being so received, and upon an upward force being supplied by the user at the hand grasp portion 16 a rotation occurs around the axis defined by the leg 24 of the U portion to bring the shorter leg 18 of the L-shaped portion 12 to bear against the vertical portion 30 of the adjustable hitch bar 29, thereby effectively frictionally locking the handle against further rotation and enabling balanced lifting of the hitch head assembly 40 by the user. Once the leg 24 is inserted through the opening 26 of the head assembly it can be locked in place by means of a cotter pin 32 (See FIGS. 5 to 7), or by other means which can be inserted through the hole 34 provided at the U portion.

While the present invention has been set forth in terms of specific embodiments thereof, it will be appreciated in view of the foregoing that numerous variations upon the invention are now enabled to those skilled in the art, which variations yet reside within the scope of the present teaching. Accordingly the invention is to be broadly construed and limited only by the scope and spirit of the claims now appended hereto.

What is claimed is:

1. A hitch handle for engaging and facilitating carrying of a hitch head assembly of the type which includes a substantially vertically extending adjustable hitch bar having one or more circular openings normally used for adjustably securing the towed load; said handle comprising:

an L-shaped portion, the elongated leg of which forms a hand grasp for the user, and the shortened leg of which extends in a direction to in use bear against a part of the hitch;

a U-shaped member, the first leg of which is secured to the elongated leg of the L-shaped portion;

the said U-shaped member being in a plane transverse to the plane of the L-shaped portion; and the second leg of the U-shaped member being removably receivable in a said opening in the substantially vertical hitch bar;

whereby upon said second leg of the U being so received, an upward force supplied by the user at the said hand grasp rotates the L around the axis defined by the second leg of the U to bring the shortened leg of the L to bear against the hitch bar and thereby the hitch head assembly, thereby frictionally locking the handle against further rotation and enabling balanced lifting of the hitch head assembly by the user.

2. An apparatus in accordance with claim 1 wherein the second portion rotatably received in said assembly opening is secured from removal by a locking device.

3. An apparatus in accordance with claim 2 wherein said hand grasp includes a compressable frictional material facilitating use of the hitch handle.

4. An apparatus in accordance with claim 1 wherein said entire apparatus is unitary.

5. An apparatus in accordance with claim 1 wherein said L-shaped portion and said U-shaped member are fabricated as separate members which are secured to one another by welding.

6. An apparatus in accordance with claim 1 wherein said apparatus comprises a durable and strong metal.

7. An apparatus in accordance with claim 1 wherein said apparatus comprises a composite plastic.

* * * * *